April 28, 1959     K. A. PANSCH     2,883,766
VERB CONJUGATING EDUCATIONAL DEVICE
Filed April 14, 1958

INVENTOR.

BY

 …

United States Patent Office

2,883,766
Patented Apr. 28, 1959

2,883,766

VERB CONJUGATING EDUCATIONAL DEVICE

Karl A. Pansch, Decatur, Ill.

Application April 14, 1958, Serial No. 728,465

1 Claim. (Cl. 35—35)

My invention relates broadly to visual teaching-aid devices. More particularly, it relates to such devices useful in the teaching of the English irregular verbs. Hereinafter, my device will be referred to as "Verb Teacher."

Figure 1:
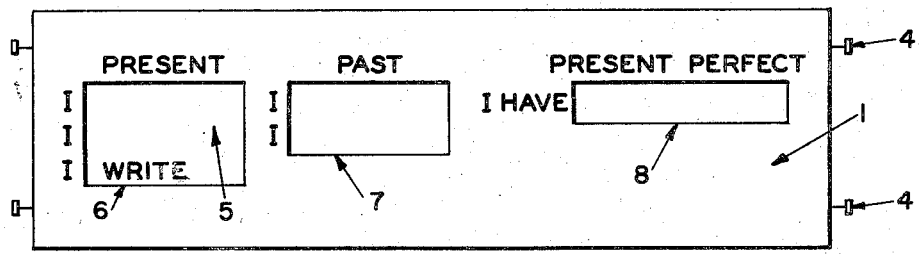
Figure 2:
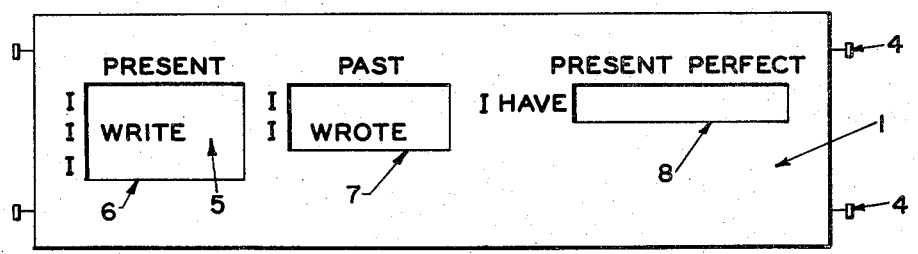
Figure 3:
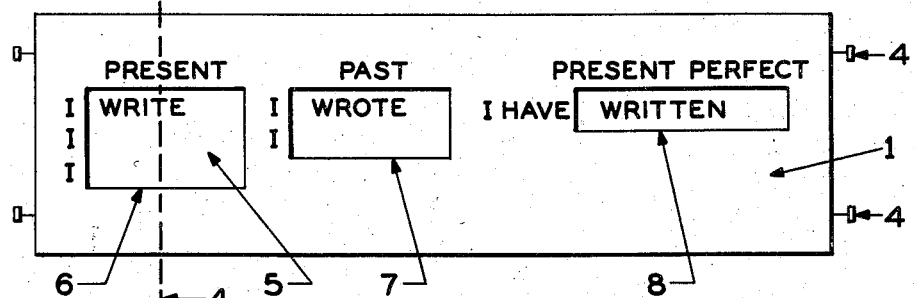
Figure 4:
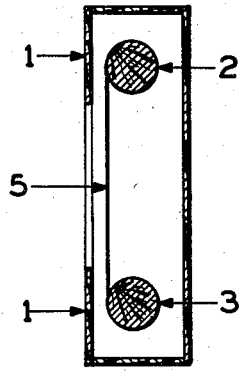

Broadly, my invention consists of a novel, simple, and useful device for bringing into view first the present tense of the verb, secondly, the past tense of the verb, and thirdly, the past participle of the verb. Furthermore, the three forms appear close together on a "screen" or view surface, and the present and past tense forms of the verb remain continuously in view until and while the past participle appears. The preferred embodiment of my invention is shown by the attached drawing in which:

Fig. 1 is a front elevation of the apparatus according to the invention showing the first appearance of the present tense of an irregular verb at the bottom of the left hand opening. Fig. 2 is another front elevation of the apparatus showing the first appearance of the past tense of the verb at the bottom of the middle opening and the continued appearance of the present tense in the left hand opening. Fig. 3 is another front elevation of the apparatus showing the first appearance of the past participle of the verb in the right hand opening and the continued appearances of the present and past tenses in their respective openings. Fig. 4 is a section on the line 4—4 in Fig. 3.

Behind a screen 1 are located two shafts, one designated by numeral 2 above the other 3. These shafts can be turned by handles 4. Fastened to both shafts is a band 5, on one side of which is inscribed the three principal parts of a plurality of irregular English verbs. The band is long, relative to the distance between the two shafts, and is so fastened and wrapped around the shafts as to be movable from one shaft to the other by appropriate turning of a shaft handle.

The screen has three openings 6, 7, and 8 of different widths measured in the direction of the band movement. These openings are so arranged that, when the upper shaft is turned and thereby moves the band upward, in the left and largest opening there will appear the present tense form of a verb. (See Fig. 1.) At this stage, i.e. by showing the present tense form of a verb, a student is given the task of naming the past tense of the same verb. This being done by the student, by a further movement of the upper shaft the band moves again in the same direction, and now the past tense form of the same verb becomes visible in the center opening which is smaller than the left opening. (See Fig. 2.) It can be seen at a glance whether the answer given was correct and also, how this verb form is spelled. Now the student should name the third principal form of the same verb, i.e. the past participle. By a further turning of the upper shaft, this form of the verb becomes visible in the right and smallest opening. Again the student is able to check the correctness of this answer and to see the spelling of this verb form. At this stage all three principal forms of the irregular verb can be seen in one row. (See Fig. 3.) With a further movement of the upper shaft in the same direction this row of verb forms will disappear behind the screen while the present tense form of the next verb appears in the left opening. The same cycle of operations as described before will be repeated for each following verb on the band. When the last row of verb forms has disappeared, by means of turning the lower shaft and moving the band in the opposite direction the band can be coiled back unto the lower shaft and make the device ready for further use.

Above the three openings on the screen are inscribed the headings "Present," "Past," and "Present Perfect." On the left side of the left opening on the screen has been inscribed the personal pronoun "I" three times, and two times on the left side of the center opening. On the left side of the right opening on the screen has been inscribed "I have" which words combined with the "Past Participle" appearing in the opening on the band form the "Present Perfect."

It has been found that the Verb Teacher arouses competition, i.e. students not only compete among themselves but each individual competes against the Verb Teacher trying to decide upon the correct answer before the Verb Teacher tells it. It helps the students to pay more attention and interest to an otherwise dry and unfavored subject. It has been furthermore found that every student can and actually does check whether given answers are correct. The students see each verb form while they hear it pronounced. The teacher need not write the three principal verb forms on the blackboard. He can show them with the Verb Teacher and have the students copy them for the purpose of learning them at home. With the Verb Teacher the teacher can check whether the students have learned the verbs and show the verb forms at the same time, which, as has been found also, results in the students learning the irregular verbs quickly even in school. The Verb Teacher, therefore, can be called a time-saving device.

My invention is not limited to the foregoing described preferred embodiment thereof. My invention includes any combination of a screen with suitable openings therein, a flexible band with the verb forms inscribed thereon, and means for controllably moving the band past the screen openings and behind the screen relative to the student observer. The essential elements in my invention are subject only to the following restrictions:

(1) The screen must be sufficiently large to conceal the band with inscribed verb forms from the students' view while the device is in operation.

(2) The three openings in the screen, through which the three principal forms of a verb can be made to appear, must be of different widths measured in the direction of band movement. The left opening (i.e. opposite the viewer's left), through which all present tense forms of the inscribed verbs can be made to appear, is the widest of the three. The middle opening, through which all the past tense forms can be made to appear, is of intermediate width, and the right opening, or the past participle opening, is the narrowest of the three. It is sufficient if the right opening is slightly wider than the height of the tallest letter in the band-inscribed verb forms, the middle opening is twice as wide as the right opening, and the left opening three times as wide as the right opening.

(3) The screen openings must be sufficiently long, measured at right angles to the band motion, to accommodate the longest verb forms inscribed on the band and in a column corresponding to a given screen opening.

(4) The band, when stretched out on a flat surface, must be straight and have parallel edges. It should be substantially non-elastic.

(5) The three principal forms of the verbs inscribed on the band are arranged in parallel columns, all the present tense forms in the left column—viewed in the direction of band movement—all the past tense forms in the middle column, and all the past participles in the right column. It is convenient, but not essential, that the forms of a given verb be arranged in a row at right angles across the band. In any event, the forms of different verbs must be in parallel rows.

I claim:

A visual-aid device for facilitating the teaching of the three principal forms of irregular English verbs to a student observer comprising in combination a screen with three differently sized openings therein, a straight thin flexible band of material adapted to the inscription of words thereon, means for controllably moving the band lengthwise past the screen openings behind the screen relative to the student observer and out of sight of the observer except for the portions visible through the openings, the band having inscribed on one side thereof the three principal forms of a plurality of irregular English verbs, the same verb forms appearing in separate columns parallel to the edge of the band, the three forms of a given verb appearing in a continuous zone or row running across the band, said zones for the different verbs being parallel to one another, the screen openings being of such size and so arranged with respect to the lengthwise motion of the band past the screen that the different verb forms appear in different openings, which openings are so arranged that the present tense form of a verb may be made to appear first by lengthwise motion of the band past the screen, followed secondly by appearance of the past tense form of the verb as the band is moved farther in the same direction, followed thirdly by appearance of the past participle form of the verb as the band is moved still farther in the same direction, the width of the present tense opening measured in the direction of the band movement being greater than that of the past tense opening, and the width of the latter being greater than that of the past participle form opening, whereby the present and past tense forms of a verb remain in view until and when the past participle form appears.

References Cited in the file of this patent
UNITED STATES PATENTS

| | | |
|---|---|---|
| 1,756,208 | Peelen | Apr. 29, 1930 |
| 2,204,931 | Gonzalen | June 18, 1940 |
| 2,546,789 | Schielke | Mar. 27, 1951 |
| 2,723,475 | Santamaria | Nov. 5, 1955 |